(12) United States Patent
Sadana et al.

(10) Patent No.: US 9,856,411 B2
(45) Date of Patent: Jan. 2, 2018

(54) METHODS OF USING A DEGRADABLE COMPONENT IN A WELLBORE AND RELATED SYSTEMS AND METHODS OF FORMING SUCH COMPONENTS

(71) Applicant: Baker Hughes Incorporated, Houston, TX (US)

(72) Inventors: Anil K. Sadana, Houston, TX (US); Jeffrey R. Potts, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 332 days.

(21) Appl. No.: 14/526,309

(22) Filed: Oct. 28, 2014

(65) Prior Publication Data
US 2016/0115368 A1 Apr. 28, 2016

(51) Int. Cl.
| | |
|---|---|
| E21B 43/28 | (2006.01) |
| C09K 8/508 | (2006.01) |
| E21B 33/12 | (2006.01) |
| E21B 31/00 | (2006.01) |

(52) U.S. Cl.
CPC ............ *C09K 8/508* (2013.01); *E21B 31/002* (2013.01); *E21B 33/12* (2013.01); *C09K 2208/08* (2013.01); *C09K 2208/10* (2013.01)

(58) Field of Classification Search
CPC ................................. E21B 43/28; E21B 34/06
USPC ......................................... 166/317, 376, 164
See application file for complete search history.

(56) References Cited

U.S. PATENT DOCUMENTS

| | | | |
|---|---|---|---|
| 7,395,882 B2 | 7/2008 | Oldham et al. | |
| 7,461,699 B2 | 12/2008 | Richard et al. | |
| 7,527,103 B2 | 5/2009 | Huang et al. | |
| 8,020,620 B2* | 9/2011 | Daniels | E21B 43/086 166/297 |
| 8,231,947 B2* | 7/2012 | Vaidya | E21B 34/14 166/192 |
| 8,528,633 B2 | 9/2013 | Agrawal et al. | |
| 9,057,242 B2* | 6/2015 | Mazyar | E21B 41/00 |
| 9,127,527 B2* | 9/2015 | Frazier | E21B 33/129 |
| 9,243,107 B2* | 1/2016 | Hedrick | C08G 65/00 |
| 2011/0132143 A1 | 6/2011 | Xu et al. | |

(Continued)

OTHER PUBLICATIONS

Wikipedia, Polyhexahydrotriazine, Aug. 24, 2016, Wikipedia p. 1-2.*

(Continued)

*Primary Examiner* — Kenneth L Thompson
(74) *Attorney, Agent, or Firm* — TraskBritt

(57) ABSTRACT

Methods of using a component in a subterranean wellbore include positioning a component including a degradable thermoset polymer material in a wellbore location, obstructing flow with the component, exposing the component to an acidic solution to degrade the selectively degradable thermoset polymer material and to remove the component from the wellbore location, and flowing a fluid through the wellbore location where the component was positioned. Methods of forming a component of a wellbore system include forming at least a portion of the component to comprise a degradable thermoset polymer material. Wellbore systems include at least one component including a selectively degradable thermoset polymer material. The selectively degradable thermoset polymer material may be a polyhexahydrotriazine ("PHT") material.

14 Claims, 1 Drawing Sheet

(56) References Cited

U.S. PATENT DOCUMENTS

2012/0211239 A1      8/2012  Kritzler et al.
2013/0043041 A1*     2/2013  McCoy ................ E21B 34/063
                                                      166/373
2013/0327540 A1*    12/2013  Hamid ................ E21B 33/1208
                                                      166/376
2014/0027127 A1      1/2014  Frazier et al.

OTHER PUBLICATIONS

Garcia et al., Recyclable, Strong Thermosets and Organogels via Paraformaldehyde Condensation with Diamines, Science, vol. 344, (2014), pp. 732-735.
Garcia et al., Supplementary Materials for Recyclable, Strong Thermosets and Organogels via Paraformaldehyde Condensation with Diamines, www.sciencemag.org/344/6185/732/suppl/DC1, May 16, 2014, 33 pages.
Meehan, Nathan D., Nanotechnology in a Gas Lift Valve?, Baker Hughes Reservoir Blog, (2003), 4 pages.
Wikipedia, "Polyhexahydrotriazine", http://en.wikipedia.org/wiki/Polyhexahydrotriazine May 19, 2014, 2 pages.

* cited by examiner

METHODS OF USING A DEGRADABLE COMPONENT IN A WELLBORE AND RELATED SYSTEMS AND METHODS OF FORMING SUCH COMPONENTS

FIELD

Embodiments of the present disclosure relate to wellbore systems that include components to be removed from the wellbore including, but not limited to, bridge plugs, gas lift valve plugs, hydraulic fracturing balls ("frac balls"), and isolation plugs. Embodiments also relate to methods of using and forming such components of wellbore systems.

BACKGROUND

Processes of subterranean drilling, completion, and production of wellbores utilize tools and components to form wellbores and to extract oil and gas from the formation surrounding the wellbores. Some of the wellbore system components may form temporary obstructions that are later removed for further drilling or completion activities. Bridge plugs, valve plugs, gravel-pack screens, and drop balls for hydraulic fracturing, expandable reamers and stabilizers, etc., are examples of wellbore system components that each form temporary obstructions. Known methods of removing such components include drilling through the components, extending a wireline into the wellbore for removal or repositioning of the components, activating a downhole mechanism for removal or repositioning of the components, reversal of fluid flow, or degradation, dissolution, or decomposition of the components.

One known decomposable material used in components of wellbore systems is IN-TALLIC®, available from Baker Hughes Incorporated of Houston, Tex. The IN-TALLIC® material is a controlled electrolytic metallic ("CEM") nanostructured material generally described in, for example, U.S. patent application Ser. No. 12/633,682 to Xu et al. and assigned to Baker Hughes Incorporated, titled "NANOMATRIX POWDER METAL COMPACT," filed Dec. 8, 2009 (hereinafter "the '682 Application"), the entire disclosure of which is incorporated herein by this reference. The IN-TALLIC® material is slightly reactive with fresh water, will disintegrate at a higher rate in salt water (brine) than in water, and will disintegrate at a higher rate in a 5% hydrochloric acid solution than in salt water.

A known dissolvable thermoplastic polymer used in components of wellbore systems is poly(glycolic acid) ("PGA"). PGA is water soluble and, therefore, components formed of PGA can be dissolved in water.

BRIEF SUMMARY

Embodiments of the present disclosure include methods of using a component in a subterranean wellbore. In accordance with such methods, a component is positioned in a wellbore location to obstruct flow of a fluid through the wellbore location. The component includes a degradable thermoset polymer. Flow of a fluid through the wellbore location is obstructed with the component, without degrading the degradable thermoset polymer. The component is exposed to an acidic solution to degrade the selectively degradable thermoset polymer and to remove the component from the wellbore location. A fluid is flowed through the wellbore location where the component was positioned.

Additional embodiments of the present disclosure include methods of forming a component of a wellbore system, including forming at least a portion of the component to include a degradable thermoset polymer material. To form the at least a portion of the component to include the degradable thermoset polymer material, paraformaldehyde is combined with a diamine material in a solvent. The combination of paraformaldehyde, diamine material, and solvent is cured at an elevated temperature of at least about 50° C. to form a polyhexahydrotriazine material.

Further embodiments of the present disclosure include a wellbore system that includes at least one component comprising a selectively degradable thermoset polymer material.

DETAILED DESCRIPTION

In the following detailed description, reference is made to the accompanying drawings, which form a part hereof, and in which is shown, by way of illustration, specific embodiments in which the present disclosure may be practiced. These embodiments are described in sufficient detail to enable a person of ordinary skill in the art to practice the present disclosure. However, other embodiments may be utilized, and structural, chemical, and process changes may be made without departing from the scope of the disclosure. The illustrations presented herein are not meant to be actual views of any particular system, device, structure, or process, but are idealized representations that are employed to describe embodiments of the present disclosure. The drawings presented herein are not necessarily drawn to scale.

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

The embodiments of the present disclosure include methods of using degradable components in a wellbore, materials for degradable wellbore components, and methods of forming degradable wellbore components. Degradable wellbore components of the present disclosure may include a selectively degradable thermoset polymer (e.g., a thermoset polymer capable of selective decomposition, disintegration, and/or depolymerization). By way of example, the degradable thermoset polymer may be degradable when exposed to an acidic solution of sufficient acidity, such as a solution of hydrochloric acid or sulfuric acid of less than about 2.0 pH. The degradable thermoset polymer may be a polyhexahydrotriazine ("PHT") material. The degraded components of the selectively degradable thermoset polymer may be dissolvable in an aqueous or organic solution or solvent (e.g., water), or capable of being suspended in an aqueous or organic solution or solvent, so as to allow them to be carried out from the wellbore by an aqueous or organic solution or solvent after the thermoset polymer has been selectively degraded.

Figure 1:
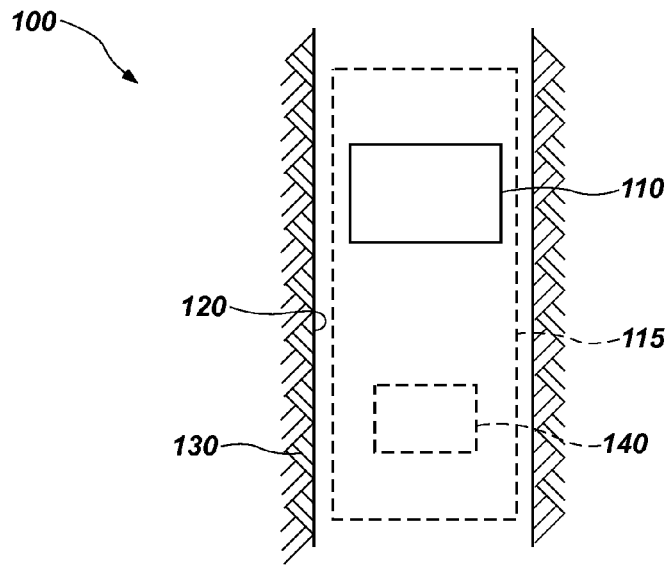
FIG. 1 shows an embodiment of a wellbore system according to the present disclosure.

Referring to FIG. 1, a wellbore system 100 includes at least one component 110 within a subterranean wellbore 120 of a formation 130. The at least one component 110 of the wellbore system 100 may be a component that is configured to be temporarily positioned at a predetermined wellbore location within the wellbore 120 and to be selectively removed from the predetermined wellbore location. By way of example and not limitation, the at least one component 110 may be a bridge plug, a drop ball (e.g., a so-called "frac ball" or "isolation ball"), a drop ball seat, an isolation plug, a valve plug (e.g., a plug of a gas lift valve, such as for a replacement of a commercially available TRANSMATIC™ plug), an expandable reamer, a stabilizer, a polymer for retaining steel beads (such as for a replacement of a binder in commercially available TELEPERF™ systems), a perforation gun body, or a gravel-pack screen. In some embodiments, the at least one component 110 may be a portion of a larger component or tool 115 (shown in FIG. 1 in dashed lines). The larger component or tool 115 of the wellbore system 100 may include portions or elements other than the at least one component 110, such as a drop ball seat 140 (shown in FIG. 1 in dashed lines), drill bit, sleeve, packer, etc. During use, the at least one component 110 may provide a temporary obstruction to fluid flow in the wellbore 120. The at least one component 110 may provide a temporary obstruction without exhibiting degradation while in use as a temporary obstruction.

At least a portion of the at least one component 110 may be formed of a selectively degradable thermoset polymer material that may be degraded (e.g., decomposed, depolymerized, and/or disintegrated) upon exposure to an acidic solution having a sufficiently low pH. For example, the sufficiently low pH may be below a threshold of about 2.0 pH. The degradable thermoset polymer material may not degrade upon exposure to a fluid, such as water, brine, hydrocarbon fluid, hydraulic fracturing fluid, or drilling mud, having a pH above the threshold. An example of such a selectively degradable thermoset polymer material is a polyhexahydrotriazine ("PHT") material, such as a PHT material described in Garcia et al., "Recyclable, Strong Thermosets and Organogels via Paraformaldehyde Condensation with Diamines," Science Magazine, vol. 344, pp. 732-735, May 16, 2014, and its Supplementary Materials, which is incorporated herein in its entirety by this reference.

In some embodiments, the at least one component 110 may be at least substantially fully formed of the degradable thermoset polymer material. In other embodiments, only a portion, such as an outer portion or one or more selected regions, of the at least one component 110 may be formed of the degradable thermoset polymer material.

The PHT material used in at least a portion of the at least one component 110 may be formed by combining paraformaldehyde with a diamine material (e.g., an aliphatic diamine material) in a solvent and curing the combination at an elevated temperature. By way of example and not limitation, the diamine material may be commercially available dianiline material, such as 4,4'-oxydianiline, 4,4'-(9-fluorenylidene)dianiline, bis-(3-aminophenyl)-methanone, 4,4'-(1, 3-phenylenedioxy)dianiline, 4,4'-(4,4'-isopropylidenediphenyl-1,1'-diyldioxy)dianiline, or 4,4'-methylenedianiline. For polymerization to occur, the solvent may include N-methylpyrrolidone ("NMP"), such as in a substantially stoichiometric amount. Since paraformaldehyde and diamine materials include generally polar molecules, the solvent may also include one or more additional polar solvents to dissolve the paraformaldehyde and diamine precursor materials, such as one or more of dimethylformamide ("DMF"), acetone, dimethyl sulfoxide ("DMSO"), and acetonitrile, for example. The diamine material and paraformaldehyde may be combined in a molar ratio of, for example, between about 1:2 and about 1:10, respectively, such as about 1:2.5. The paraformaldehyde, diamine material, and solvent may be stirred together to dissolve the paraformaldehyde and diamine material in the solvent, such as at about 50° C. for at least about fifteen minutes.

The combination of the diamine material and paraformaldehyde in a solvent may then be cured at an elevated temperature, such as, for example, by heating at about 50° C. for one hour, ramping the temperature of the combination from about 50° C. to about 200° C. over a period of about one hour, and then holding the combination at about 200° C. for about one hour. Relatively large volumes of the combination may cure by holding the combination at the same temperatures for longer periods of time. In some embodiments, the combination may be cured by heating or holding the combination at the elevated temperature in a low-pressure environment, such as a vacuum. Such modifications of the example curing scheme listed above may be determined by one of ordinary skill in the art given a sample size, a particular composition, etc. In any case, the process or a variation thereof may be performed to result in a cured thermoset polymer PHT material.

The PHT material may be cured in a mold (e.g., in an injection molding machine or a cast) having a predetermined shape to form the at least one component 110, and/or a volume of the PHT material may be formed and later shaped (e.g., cut, machined) to form the at least one component 110.

The PHT material may be degradable in a sufficiently acidic solution. For example, the PHT material may degrade (e.g., depolymerize) when exposed to an acidic solution having a pH of less than about 2.0. On the other hand, the PHT material may be chemically stable when exposed to a fluid having a pH of more than about 2.0, such as about 3.0 or more. Accordingly, the PHT material may be mechanically and chemically stable in many wellbore fluids, such as water, salt water (i.e., brine), hydrocarbon fluids, drilling mud, hydraulic fracturing fluids, etc. However, the PHT material may be selectively degradable by exposing the PHT material to a sufficiently acidic solution (having, e.g., a pH of about 2.0 or less).

In some embodiments, prior to curing, one or more filler materials may be added to the combination of paraformaldehyde and diamine material in the solvent. Such filler materials may be included to modify the mechanical properties of the resulting PHT material. By way of example and not limitation, filler materials may include one or more of the following: carbon nanotubes (e.g., in quantities of between about 2% and 5% by weight of the total combination), graphene, graphene oxide, graphite, carbon fibers, glass fibers, nylon particles, controlled electrolytic metallic ("CEM") particles, molybdenum sulfide, water-soluble poly (vinyl alcohol) fibers, or active metal particles or fibers (e.g., aluminum, magnesium, zinc, manganese).

In some embodiments, the filler material may comprise a material that dissolves or degrades in water or an acidic solution, such that the reactive filler material may dissolve or degrade upon exposure to the acidic solution used to degrade the PHT material. In some embodiments, the filler material may comprise a reactive material having a composition that will react with the acidic solution used to degrade the PHT material. For example, CEM or other metal particles or fibers may also degrade in the presence of the acidic solution used to degrade the PHT material. Additionally, reinforcing fibers of water-soluble polymers, such as poly (vinyl alcohol), can completely dissolve in the acidic media used to degrade the PHT material. In other embodiments, the filler material may be a non-reactive or less reactive material that is not dissolvable or degradable (or that is dissolvable or degradable at a substantially slower rate than the PHT material) in the acidic solution used to degrade the PHT material. Such non-reactive or less reactive filler materials may be sized sufficiently small to be flushed away in fluids within the wellbore 120 upon degradation of the PHT material, to enable removal of the at least one component 110 via degradation of the PHT material, even in a case where the filler materials are not similarly degradable or dissolvable. For example, carbon nanotubes, carbon fibers, and glass fibers may be used in sufficiently small quantities and/or small fiber or particle sizes to be flushed away in wellbore fluids upon degradation of the PHT material in the acidic solution.

In further embodiments, the at least one component 110 may comprise a fiber matrix composite material that includes the PHT material as the matrix phase, and fibers as a discontinuous reinforcing phase. For example, the combination of paraformaldehyde, diamine material, and solvent may be applied to a glass, KEVLAR®, carbon fiber, or other fiber fabric or weave and cured at ambient pressure or reduced pressure to form the at least one component 110 or a portion thereof.

By way of example and not limitation, the PHT material may have mechanical properties sufficient to withstand conditions within the wellbore 120 during use of the at least one component 110 including the PHT material. By way of example and not limitation, the PHT material used for the at least a portion of the at least one component 110 may be mechanically stable to at least about 50° C., to at least about 100° C., to at least about 200° C., or even to at least about 220° C., depending on a selected method of manufacture (e.g., depending on selected chemical component(s) and ratios, selected filler material(s), curing temperature, curing time, etc.). The PHT material may have a Young's modulus of at least about 10.0 GPa (e.g., about 14.0 GPa, or even about 20.0 GPa when carbon nanotube fillers are included in the PHT material). The at least one component 110 including the PHT material may have sufficient strength to remain mechanically stable during use in the wellbore 120 when exposed to wellbore fluid pressure of at least about 3,000 psi, at least about 5,000 psi, at least about 8,000 psi, or at least about 10,000 psi, depending on the application and depending on the particular composition and manufacturing process used to form the PHT material.

The PHT material may have improved mechanical properties compared to known degradable thermoplastic polymers, such as PGA. For example, the PHT material may have a higher compressive strength, stability up to a higher temperature, and greater (e.g., complete) resistance to dissolution in water, compared to PGA. Compared to IN-TALLIC® materials, the PHT material may have a greater (e.g., complete) resistance to dissolution in water or salt water, and, therefore, may be used in applications with water or salt water without degradation or with only low levels of degradation. In addition, the PHT material may be easier and/or cheaper to manufacture than IN-TALLIC® materials of a similar size and shape.

Figure 2:
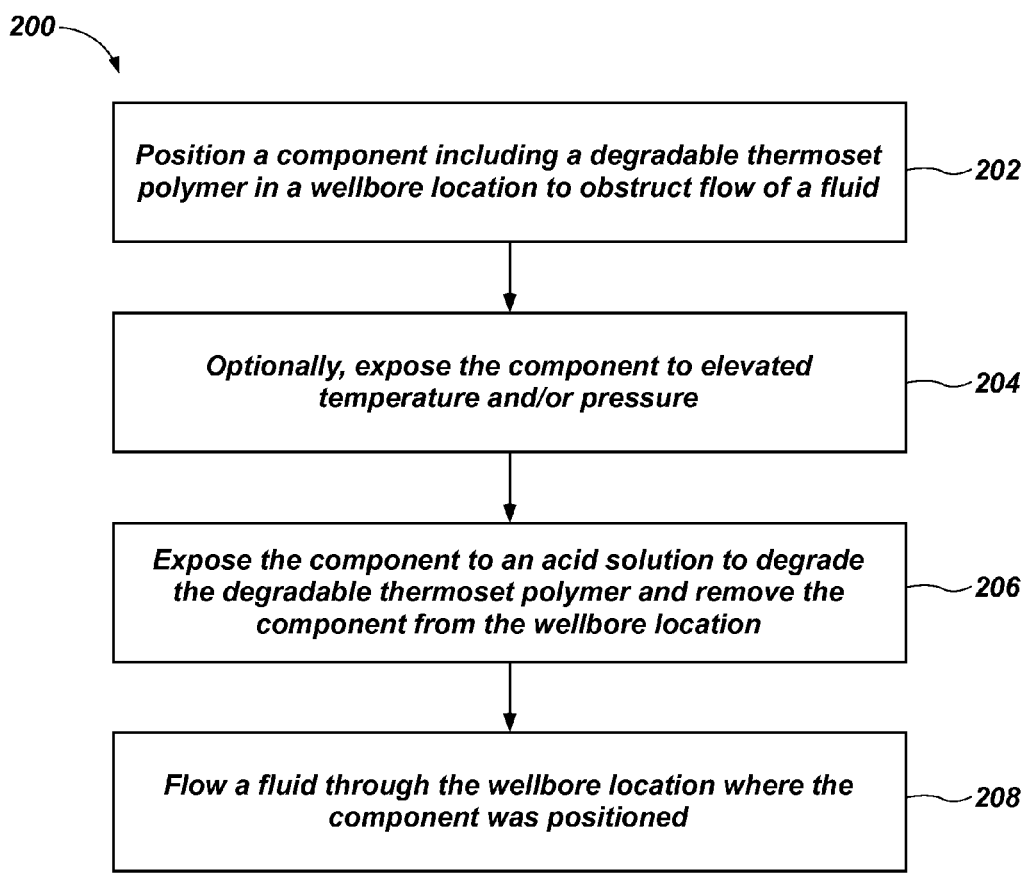
FIG. 2 illustrates a flowchart of an example process for using at least one component in a wellbore operation according to an embodiment of the present disclosure.

FIG. 2 illustrates a flowchart of an example process 200 for using at least one component 110 (FIG. 1) in a wellbore operation, such as a drilling, completion, or production operation. As indicated at operation 202 of FIG. 2, and also referring to elements shown in FIG. 1, the at least one component 110, which includes a degradable thermoset polymer, may be positioned in a wellbore location. The wellbore location may be a fixed location relative to the wellbore 120 or relative to a tool within the wellbore 120.

The at least one component 110 may temporarily obstruct fluid flow in the wellbore location, such as flow of drilling mud, water, brine, completion fluid, hydraulic fracturing fluid, hydrocarbon fluid, a slurry, etc. Depending on the identity and function of the at least one component 110, the obstruction of the fluid flow may fully prevent fluid flow past the wellbore location (such as in embodiments that the at least one component 110 is a bridge plug, an isolation plug, or a drop ball for an isolation plug), or may simply divert fluid flow around and past the at least one component 110 or portions thereof (such as in embodiments that the at least one component 110 is a hydraulic fracturing ball, a valve plug, or a gravel-pack screen).

Optionally, in some embodiments, the at least one component 110 may be exposed to an elevated temperature and/or pressure, as indicated at operation 204 of FIG. 2. For example, elevated temperatures to which the at least one component 110 may be exposed in the wellbore 120 may be at least about 50° C., at least about 100° C., at least about 150° C., or at least about 200° C. By way of further example, elevated pressures to which the at least one component 110 may be exposed in the wellbore 120 may be at least about 3,000 psi, at least about 5,000 psi, at least about 8,000 psi, or at least about 10,000 psi. The at least one component 110, including the degradable thermoset polymer thereof, may be configured to be mechanically stable at such temperatures and/or pressures. For example, the degradable thermoset polymer of the at least one component 110 may be formed of materials and by processes (described above) to enable the degradable thermoset polymer to undergo glass transition (and resulting mechanical softening) at or above the elevated temperature and/or elevated pressure to which the at least one component 110 is to be exposed in a particular application.

After the at least one component 110 (FIG. 1) has served its purpose in the wellbore location, the at least one component 110 may be exposed to an acidic solution (e.g., a solution of hydrochloric acid or sulfuric acid) to degrade the degradable thermoset polymer thereof, as indicated at operation 206 of FIG. 2. Depending on several factors, such as the acidity, temperature, and pressure of the acidic solution, and the size, shape, properties, and composition of the at least one component 110, the degradation of the degradable thermoset polymer sufficient to remove the at least one component 110 from the wellbore location may be completed within several minutes (e.g., about 10 minutes) up to several hours (e.g., about 6 hours) of exposure to the acidic solution. Accordingly, in some embodiments, efficient removal of the at least one component 110 from the wellbore location in which the at least one component 110 is positioned may be accomplished without conventional intervention techniques, such as wireline intervention, flow reversal, drilling, etc.

As indicated at operation 208 of FIG. 2, after the at least one component 110 has served its purpose and is removed from the wellbore location through acid degradation of the degradable thermoset polymer thereof, a fluid may be flowed through the wellbore location where the at least one component 110 (FIG. 1) was previously positioned. For example, in a drilling operation, drilling mud may be flowed through the wellbore location to resume drilling. By way of another example, in a completion operation, hydraulic fracturing fluids, water, or a gravel slurry may be flowed through the wellbore location. By way of a further example, in a production operation, hydrocarbon fluids or gas for a gas lift operation may be flowed through the wellbore location after the at least one component 110 is removed by acid degradation.

By way of one example, referring to FIG. 1 and FIG. 2, the at least one component 110 may be a drop ball, at least a portion of which is a degradable thermoset polymer material (e.g., a PHT material). The drop ball may be sized to fit through other tools and components of the wellbore system 100 (e.g., drill pipe, casing, joints) until coming to rest against the drop ball seat 140 of the wellbore system 100. In operation, the drop ball may be positioned within the wellbore 120 by dropping the drop ball into a fluid flow within the wellbore 120 to form a seal against the drop ball seat 140. Fluid pressure may be applied against the seated drop ball, which forms a temporary flow obstruction in the wellbore 120, to apply a force to the drop ball seat 140. The force may actuate a mechanism, such as a fracturing valve to open ports in the wellbore to facilitate fracturing or application of chemical treatments to the formation 130. After the drop ball has served its purpose in the wellbore location, the temporary obstruction formed by the drop ball may be removed via acid degradation of the drop ball or a portion thereof. When the drop ball is sufficiently degraded, a remaining portion of the drop ball may be sufficiently small to drop through an opening in the drop ball seat 140, and the temporary obstruction formed by the drop ball is removed from the wellbore location at the drop ball seat 140. In some embodiments, further degradation of the drop ball may occur upon further exposure to an acidic solution, such that up to the entire drop ball may be fully degraded to avoid creating an unwanted obstruction elsewhere in the wellbore 120.

Additional non-limiting example embodiments of the present disclosure are set forth below.

Embodiment 1

A method of using a component in a subterranean wellbore, the method comprising: positioning a component comprising a degradable thermoset polymer in a wellbore location; obstructing, with the component, flow of a fluid through the wellbore location without degrading the thermoset polymer; exposing the component to an acidic solution to degrade the degradable thermoset polymer and to remove the component from the wellbore location; and flowing a fluid through the wellbore location where the component was positioned.

Embodiment 2

The method of Embodiment 1, wherein positioning a component in a wellbore location comprises positioning a drop ball against a drop ball seat.

Embodiment 3

The method of Embodiment 1 or Embodiment 2, wherein positioning a component comprising a degradable thermoset polymer in a wellbore location comprises positioning the component comprising a polyhexahydrotriazine material in the wellbore location.

Embodiment 4

The method of any one of Embodiments 1 through 3, wherein exposing the component to an acidic solution comprises exposing the component to the acidic solution exhibiting a pH of less than about 2.0.

Embodiment 5

The method of any one of Embodiments 1 through 4, wherein flowing a fluid through the wellbore location comprises flowing a fluid selected from the group consisting of water, salt water, a hydrocarbon fluid, a hydraulic fracturing fluid, drilling mud, a gravel slurry, completion fluid, and gas for a gas lift operation.

Embodiment 6

The method of any one of Embodiments 1 through 5, further comprising, prior to exposing the component to an acidic solution, exposing the component in the wellbore location to at least one of an elevated temperature of at least about 50° C. and an elevated pressure of at least about 3,000 psi.

Embodiment 7

The method of Embodiment 6, further comprising exposing the component in the wellbore location to at least one of an elevated temperature of at least about 100° C. and an elevated pressure of at least about 5,000 psi.

Embodiment 8

A method of forming a component of a wellbore system, the method comprising: forming at least a portion of the component to comprise a degradable thermoset polymer material, comprising: combining paraformaldehyde with a diamine material in a solvent; and curing the combination of the paraformaldehyde, diamine material, and solvent at an elevated temperature of at least about 50° C. to form a polyhexahydrotriazine material.

Embodiment 9

The method of Embodiment 8, wherein combining paraformaldehyde with a diamine material in a solvent comprises combining the paraformaldehyde with the diamine material in a solvent comprising N-methylpyrrolidone.

Embodiment 10

The method of Embodiment 8 or Embodiment 9, wherein forming at least a portion of the component comprises forming the at least a portion of the component within a mold.

Embodiment 11

The method of any one of Embodiments 8 through 10, wherein forming at least a portion of the component further comprises adding at least one filler material to the combination of the paraformaldehyde, diamine material, and solvent, the at least one filler material selected from the group consisting of graphene, graphene oxide, graphite, carbon nanotubes, carbon fibers, nylon particles, controlled electrolytic metallic particles, molybdenum sulfide, water-soluble poly(vinyl alcohol) fibers, and active metal particles or fibers.

Embodiment 12

The method of any one of Embodiments 8 through 11, wherein forming at least a portion of the component to comprise a degradable thermoset polymer material comprises substantially fully forming the component of the degradable thermoset polymer material.

Embodiment 13

A wellbore system, comprising: at least one component comprising a selectively degradable thermoset polymer material.

Embodiment 14

The wellbore system of Embodiment 13, wherein the selectively degradable thermoset polymer material comprises a polyhexahydrotriazine material.

Embodiment 15

The wellbore system of Embodiment 13 or Embodiment 14, wherein the polyhexahydrotriazine material is formed of materials comprising a diamine material selected from the group consisting of 4,4'-oxydianiline, 4,4'-(9-fluorenylidene)dianiline, bis-(3-aminophenyl)-methanone, 4,4'-(1,3-phenylenedioxy)dianiline, 4,4'-(4,4'-isopropylidenediphenyl-1,1'-diyldioxy)dianiline, and 4,4'-methylenedianiline.

Embodiment 16

The wellbore system of any one of Embodiments 13 through 15, wherein the at least one component is selected from the group consisting of a drop ball, a drop ball seat, an isolation plug, a valve plug, an expandable reamer, a stabilizer, a perforation gun body and a gravel-pack screen.

Embodiment 17

The wellbore system of any one of Embodiments 13 through 16, wherein the at least one component consists essentially of the selectively degradable thermoset polymer material.

Embodiment 18

The wellbore system of any one of Embodiments 13 through 17, wherein the selectively degradable thermoset polymer material comprises at least one filler material.

Embodiment 19

The wellbore system of Embodiment 18, wherein the at least one filler material is selected from the group consisting of graphene, graphene oxide, graphite, carbon nanotubes, carbon fibers, glass fibers, nylon particles, controlled electrolytic metallic particles, molybdenum sulfide, water-soluble poly(vinyl alcohol) fibers, and active metal particles or fibers.

Embodiment 20

The wellbore system of any one of Embodiments 13 through 19, wherein the selectively degradable thermoset polymer material is selectively degradable by exposure to an acidic solution having a pH of less than about 2.0.

The embodiments of the disclosure described above and illustrated in the accompanying drawing figures do not limit the scope of the invention, since these embodiments are merely examples of embodiments of the disclosure. The invention is encompassed by the appended claims and their legal equivalents. Any equivalent embodiments lie within the scope of this disclosure. Indeed, various modifications of the present disclosure, in addition to those shown and described herein, such as other combinations and modifications of the elements described, will become apparent to those of ordinary skill in the art from the description. Such embodiments, combinations, and modifications also fall within the scope of the appended claims and their legal equivalents.

What is claimed is:

1. A method of using a component in a subterranean wellbore, the method comprising:
    positioning a component comprising a degradable thermoset polymer in a wellbore location, the degradable thermoset polymer comprising a polyhexahydrotriazine material, the polyhexahydrotriazine material being mechanically stable when exposed to wellbore temperatures in a range between 50° C. and 220° C., inclusive, and at wellbore fluid pressures equal to or greater than about 3,000 psi;
    obstructing, with the component, flow of a fluid through the wellbore location without degrading the degradable thermoset polymer;
    exposing the component to an acidic solution to degrade the degradable thermoset polymer and to remove the component from the wellbore location; and
    flowing a fluid through the wellbore location where the component was positioned.

2. The method of claim 1, wherein positioning a component in a wellbore location comprises positioning a drop ball against a drop ball seat.

3. The method of claim 1, wherein exposing the component to an acidic solution comprises exposing the component to the acidic solution exhibiting a pH of less than about 2.0.

4. The method of claim 1, wherein flowing a fluid through the wellbore location comprises flowing a fluid selected from the group consisting of water, salt water, a hydrocarbon fluid, a hydraulic fracturing fluid, drilling mud, a gravel slurry, completion fluid, and gas for a gas lift operation.

5. The method of claim 1, further comprising, prior to exposing the component to an acidic solution, exposing the component in the wellbore location to at least one of an elevated temperature of at least about 50° C. and an elevated pressure of at least about 3,000 psi.

6. The method of claim 5, further comprising exposing the component in the wellbore location to at least one of an elevated temperature of at least about 100° C. and an elevated pressure of at least about 5,000 psi.

7. The method of claim 1, wherein the component is selected from the group consisting of a drop ball, a drop ball seat, an isolation plug, a valve plug, an expandable reamer, a stabilizer, a perforation gun body, and a gravel-pack screen.

8. A wellbore system, comprising:
    at least one component comprising a selectively degradable thermoset polymer material, wherein the selectively degradable thermoset polymer material comprises a polyhexahydrotriazine material, the polyhexahydrotriazine material being mechanically stable when exposed to wellbore temperatures in a range between 50° C. and 220° C., inclusive, and at wellbore fluid pressures equal to or greater than about 3,000 psi.

9. The wellbore system of claim 8, wherein the polyhexahydrotriazine material is formed of materials comprising a diamine material selected from the group consisting of 4,4'-oxydianiline, 4,4'-(9-fluorenylidene)dianiline, bis-(3-aminophenyl)-methanone, 4,4'-(1,3-phenylenedioxy)dianiline, 4,4'-(4,4'-isopropylidenediphenyl-1,1'-diyldioxy)dianiline, and 4,4'-methylenedianiline.

10. The wellbore system of claim 8, wherein the at least one component is selected from the group consisting of a drop ball, a drop ball seat, an isolation plug, a valve plug, an expandable reamer, a stabilizer, a perforation gun body, and a gravel-pack screen.

11. The wellbore system of claim 8, wherein the at least one component consists essentially of the selectively degradable thermoset polymer material.

12. The wellbore system of claim 8, wherein the selectively degradable thermoset polymer material comprises at least one filler material.

13. The wellbore system of claim 12, wherein the at least one filler material is selected from the group consisting of graphene, graphene oxide, graphite, carbon nanotubes, carbon fibers, glass fibers, nylon particles, controlled electrolytic metallic particles, molybdenum sulfide, water-soluble poly(vinyl alcohol) fibers, and active metal particles or fibers.

14. The wellbore system of claim 8, wherein the selectively degradable thermoset polymer material is selectively degradable by exposure to an acidic solution having a pH of less than about 2.0.

\* \* \* \* \*